(12) United States Patent
Young

(10) Patent No.: US 11,444,851 B2
(45) Date of Patent: Sep. 13, 2022

(54) SYSTEMS AND METHODS OF USING ADAPTIVE NETWORK INFRASTRUCTURES

(71) Applicant: Verizon Patent and Licensing Inc., Basking Ridge, NJ (US)

(72) Inventor: Kristen Sydney Young, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/846,543

(22) Filed: Apr. 13, 2020

(65) Prior Publication Data

US 2021/0320850 A1   Oct. 14, 2021

(51) Int. Cl.

| | |
|---|---|
| *H04L 41/5009* | (2022.01) |
| *G06F 16/245* | (2019.01) |
| *H04L 41/0803* | (2022.01) |
| *H04L 41/5019* | (2022.01) |
| *H04L 41/0895* | (2022.01) |
| *H04L 41/342* | (2022.01) |
| *H04L 41/40* | (2022.01) |
| *H04L 41/50* | (2022.01) |

(52) U.S. Cl.
CPC ........ *H04L 41/5012* (2013.01); *G06F 16/245* (2019.01); *H04L 41/0803* (2013.01); *H04L 41/5019* (2013.01)

(58) Field of Classification Search
CPC ............. H04L 41/5012; H04L 41/0803; H04L 41/5019; G06F 16/245; H03M 13/6525; H04J 2211/005
See application file for complete search history.

(56) References Cited

U.S. PATENT DOCUMENTS

| | | | | |
|---|---|---|---|---|
| 2004/0153563 | A1* | 8/2004 | Shay | H04L 41/5025 709/232 |
| 2015/0281004 | A1* | 10/2015 | Kakadia | H04L 41/0816 370/235 |

(Continued)

FOREIGN PATENT DOCUMENTS

WO   WO-2020104969 A1 *   5/2020   ......... H04L 41/5009

OTHER PUBLICATIONS

Author: Rekha M Das et al. Title: "Key Enablers to Deliver Latency-as-a-Service in 5G Networks" Date: Nov. 2019 Publisher: 27th Telecommunication Forum TELFOR 2019 (Year: 2019).*

*Primary Examiner* — John A Follansbee
*Assistant Examiner* — Kamal Hossain

(57) ABSTRACT

A method, system, and computer-readable medium may provide for receiving network performance indicator data associated with a network slice connected to a user equipment (UE) device via a first type of network infrastructure; determining, based on the network performance indicator data, that one or more service level agreements (SLAs) for the network slice will not be met or are not currently being met; identifying a second type of network infrastructure based on service requirements for the network slice, wherein the network requirements include the one or more SLAs and a service profile; accessing a network function virtualization infrastructure (NFVI) inventory to determine a supportability for the instantiation of the second type of network infrastructure; and instructing an orchestrator to deploy the second type of network infrastructure over the access network.

20 Claims, 5 Drawing Sheets

(56) References Cited

U.S. PATENT DOCUMENTS

| | | | |
|---|---|---|---|
| 2017/0141973 A1* | 5/2017 | Vrzic | H04W 48/06 |
| 2018/0091417 A1* | 3/2018 | Oré | G06F 9/4401 |
| 2018/0248787 A1* | 8/2018 | Rajagopal | H04W 28/0278 |
| 2018/0316564 A1* | 11/2018 | Senarath | H04L 41/5051 |
| 2018/0332441 A1* | 11/2018 | Shaw | H04L 67/1044 |
| 2018/0359337 A1* | 12/2018 | Kodaypak | H04L 43/08 |
| 2019/0123963 A1* | 4/2019 | Tang | H04W 4/70 |
| 2019/0223055 A1* | 7/2019 | Bor Yaliniz | H04W 28/26 |
| 2019/0327149 A1* | 10/2019 | Sun | H04L 41/5051 |
| 2019/0335349 A1* | 10/2019 | Vaishnavi | H04W 24/06 |
| 2020/0045548 A1* | 2/2020 | Dowlatkhah | H04W 12/08 |
| 2020/0059487 A1* | 2/2020 | Malik | H04L 9/0643 |
| 2020/0084107 A1* | 3/2020 | Li | H04L 65/1073 |
| 2020/0313969 A1* | 10/2020 | Li | H04L 41/5051 |
| 2020/0366612 A1* | 11/2020 | Kommula | H04L 47/28 |
| 2020/0412612 A1* | 12/2020 | Cherunni | H04L 41/0896 |
| 2021/0084582 A1* | 3/2021 | Li | H04W 24/08 |
| 2021/0112565 A1* | 4/2021 | Bhaskaran | H04W 24/08 |
| 2021/0160153 A1* | 5/2021 | Akman | H04L 41/0823 |
| 2021/0176823 A1* | 6/2021 | Mishra | H04W 88/16 |

* cited by examiner

SYSTEMS AND METHODS OF USING ADAPTIVE NETWORK INFRASTRUCTURES

BACKGROUND

To meet the diverse demands of mobile communication consumers, providers of wireless communication services continue to develop application service offerings and provision data transport domains for their delivery. One enhancement includes the development of disaggregated network architectures along with optimized provisioning management. Virtualized transport domains may connect different network functions for application services requiring varying service levels (e.g., latency). Given network traffic realities, the limited number of paths that are capable of maintaining a particular level of service poses various technological challenges from a network-side perspective and an end device perspective.

DETAILED DESCRIPTION OF THE PREFERRED EMBODIMENTS

Figure 1:
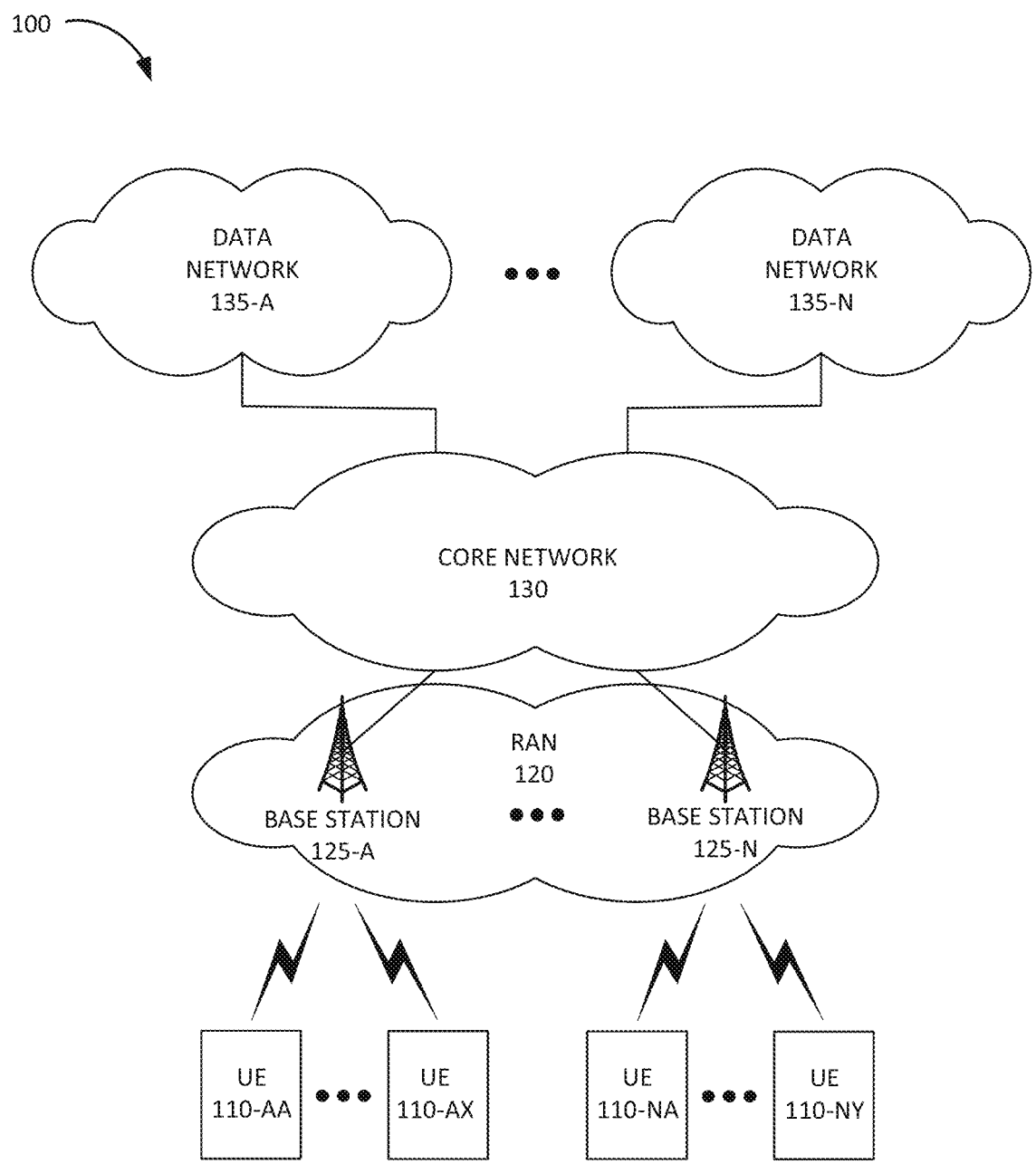
FIG. 1 is a diagram illustrating a network environment according to an implementation described herein.

The following detailed description refers to the accompanying drawings. The same reference numbers in different drawings may identify the same or similar elements. The following detailed description does not limit the invention.

As communication services increase in number, complexity, and varied use, the management of provider systems has become more technologically challenging. One way in which radio access networks (RANs) are advancing is through the incorporation of various aspects of next generation networks, such as Fifth Generation (5G) mobile networks, utilizing high frequency bands (e.g., 24 Gigahertz (GHz), 39 GHz, etc.), and/or lower frequency bands such as sub-6 GHz, and beamforming. 5G New Radio (NR) millimeter (mm) wave (mmWave) technology may provide significant flexibility in bandwidth allocation and/or improved spectral efficiency over other wireless network technology. Furthermore, coverage and signal quality may be improved using multiple-input and multiple-output (MIMO) adaptive antenna arrays.

Additionally, management of disaggregated networks associated with wireless RANs may provide particularized functionality, such as, for example, multi-access edge computing (MEC), also known as mobile edge computing, platforms. MEC platforms may include core network capabilities (e.g., computational, storage, etc.) that are situated at different types of locations (e.g., datacenters) in the network, including "edge" network sites, aggregation network sites, and "far edge" network sites to improve network performance at an application service layer and to reduce the amount of data traffic at the core network. MEC platforms may enhance service reliability over cloud-based services or and end device processor.

MEC networks or other types of end device application or service layer networks (referred to as "application service layer network") provide varied network resources (e.g., physical, logical, virtual) to service end devices operating in a coverage area. For example, a particular MEC network may implement network resources for a limited number of end devices/users being served, the number of applications executing at any given time, the amount of traffic involved, the state of the MEC network (e.g., in the process of being deployed, reconfigured, upgraded; failures, congestion, etc.), and/or the state of neighboring MEC networks (e.g., failures, congestion, etc.). Consequently, MEC networks or other types of application service layer networks may support a particular level of quality of service (QoS) associated with an application and/or a service (referred to as an "application service"). For example, the delivery of an application service to an end device may enhance various performance metrics, such as latency, error rate, throughput, packet loss, etc. Depending on the types of applications and services requested from the end devices, MEC servers may or may not be used, and/or MEC networks may reside in different parts of a network (e.g., co-located with a RAN, co-located with a core network, co-located with a backhaul/fronthaul network, etc.) that are configurable to provide different services and applications, and support specific service requirements (e.g., specific service level agreements (SLAs)). Configurable network policies and/or rules that include threshold parameters and values may be applied to efficiently manage the allocation and utilization of network resources responsive to the demands of the end devices.

MEC networks and other types of application service layer networks may use a virtualization technology for provisioning of an application service. For example, the virtualization of a network device may be implemented based on a virtual container or a virtual machine (VM) (referred to as a "virtual network device") along with other virtualization technology/architecture, such as a hypervisor, a container engine, and underlying hardware resources of the network device (e.g., a host device). The virtualization technology and/or architecture support the creation, deletion, and intermediary operational state (also known as the "lifecycle") of the virtual network device and instance of the application service. A network device may include one or multiple instances of the virtual network device (and associated one or multiple instances of the application service, which may be the same or different application services) and the configuration may differ depending on the virtualization technology and/or architecture implemented.

Moreover, management of core networks associated with wireless RANs may provide particularized functionality, such as, for example, "network slicing." Network slicing may include a form of virtualized networking architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, configured to implement a particular set of requirements and/or priorities, and/or may be associated with a particular QoS class, type of service, and/or particular enterprise customer associated with a set of UE devices.

When a UE device is configured and activated by a wireless network, the UE device may be configured to connect to one or more types of network slices. The allowed slices for the UE device may be configured using a Network Slice Selection Function (NSSF) device and stored in a subscription profile, associated with the UE device, for example, in a Unified Data Management (UDM) device. When the UE device requests a connection to an available network slice, the UE may send a request to an Access and Mobility Function (AMF) device and the AMF device may provide a list of allowed network slices to the UE device. The UE device may then request a Packet Data Unit (PDU) connection with the requested network slice.

In some implementations, the slice selection for a UE device may be performed statically during the initial configuration of the UE device based on particular service requirements that may include SLAs and service profiles associated with a particular application service. In other implementations, the slice selection for a UE device may be performed dynamically to maintain service availability in response to congestion and/or faults occurring in the underlying data transport path (e.g., RAN).

FIG. 1 is a diagram of an exemplary environment 100 in which the systems and/or methods, described herein, may be implemented. As shown in FIG. 1, environment 100 may include UE devices 110-AA to 110-NY (referred to herein collectively as "UE devices 110" and individually as "UE device 110"), a radio access network (RAN) 120, a core network 130, and data networks 135-A to 135-N.

UE device 110 may include any device with wireless communication functionality (e.g., using a cellular or mobile wireless network). For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), an autonomous or semi-autonomous vehicle, an unmanned aerial drone, and/or another type of electronic device.

RAN 120 may enable UE devices 110 to connect to core network 130 for mobile telephone service, Short Message Service (SMS) messaging service, Multimedia Message Service (MMS) messaging service, Internet access, cloud computing, and/or other types of data services. RAN 120 may include base stations 125-A to 125-N (referred to herein collectively as "base stations 125" and individually as "base station 125"). Each base station 125 may service a set of UE devices 110. For example, base station 125-A may service UE devices 110-AA to 110-AX, etc., and base station 125-N may service UE devices 110-NA to 110-NY. In other words, UE devices 110-AA to 110-AX may be located within the geographic area serviced by base station 125-A, and other UE devices 110 may be serviced by another base station 125.

Base station 125 may include a 4G long-term evolution (LTE) base station (e.g., an evolved Node B (eNodeB)) or a 5G NR base station (e.g., a next generation Node B (gNodeB)) which may include one or more devices and/or other components and functionality that enable UE device 110 to wirelessly connect to core network 130 using 5G NR Radio Access Technology (RAT). Base station 125 may include one or more radio frequency (RF) transceivers (also referred to as "cells" and/or "base station sectors") facing particular directions. For example, base station 125 may include three RF transceivers and each RF transceiver may service a 120° sector of a 360° field of view. If base station 125 includes a 5G NR base station, each RF transceiver may include an antenna array. The antenna array may include an array of controllable antenna elements configured to send and receive 5G NR wireless signals via one or more antenna beams. The antenna array may serve k UE devices 110, and may simultaneously generate up to k antenna beams. A particular antenna beam may service multiple UE devices 110. Furthermore, in some implementations, base station 125 may include a MEC system that performs processing services for UE devices 110.

Core network 130 may manage communication sessions for UE devices 110. For example, core network 130 may establish an Internet Protocol (IP) connection between UE device 110 and a particular data network 135. Furthermore, core network 130 may enable UE device 110 to communicate with an application server, and/or another type of device, located in a particular data network 135 using a communication method that may not require the establishment of an IP connection between UE device 110 and data network 135, such as, for example, Data over Non-Access Stratum (DoNAS).

In some implementations, core network 130 may include an LTE Advanced (LTE-A) network and/or a 5G core network or other advanced network that includes functionality such as management of 5G NR base stations in radio access network 120, which may implement carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band IoT (NB-IoT)

technology, and/or other types of MTC technology; and/or other types of LTE-A and/or 5G functionality.

Furthermore, core network 130 may include a 4G LTE core network (e.g., an evolved packet core (EPC) network). In other implementations, core network 130 may include a Code Division Multiple Access (CDMA) network. For example, the CDMA network may include a CDMA enhanced High Rate Packet Data (eHRPD) network (which may provide access to an LTE network).

Data networks 135-A to 135-N (referred to herein collectively as "data networks 135" and individually as "data network 135") may each include a packet data network. A particular data network 135 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 135 may be managed by a communication services provider that also manages core network 130, RAN 120, and/or particular UE devices 110.

In some implementations, a particular data network 135 may include an IP Multimedia Subsystem (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
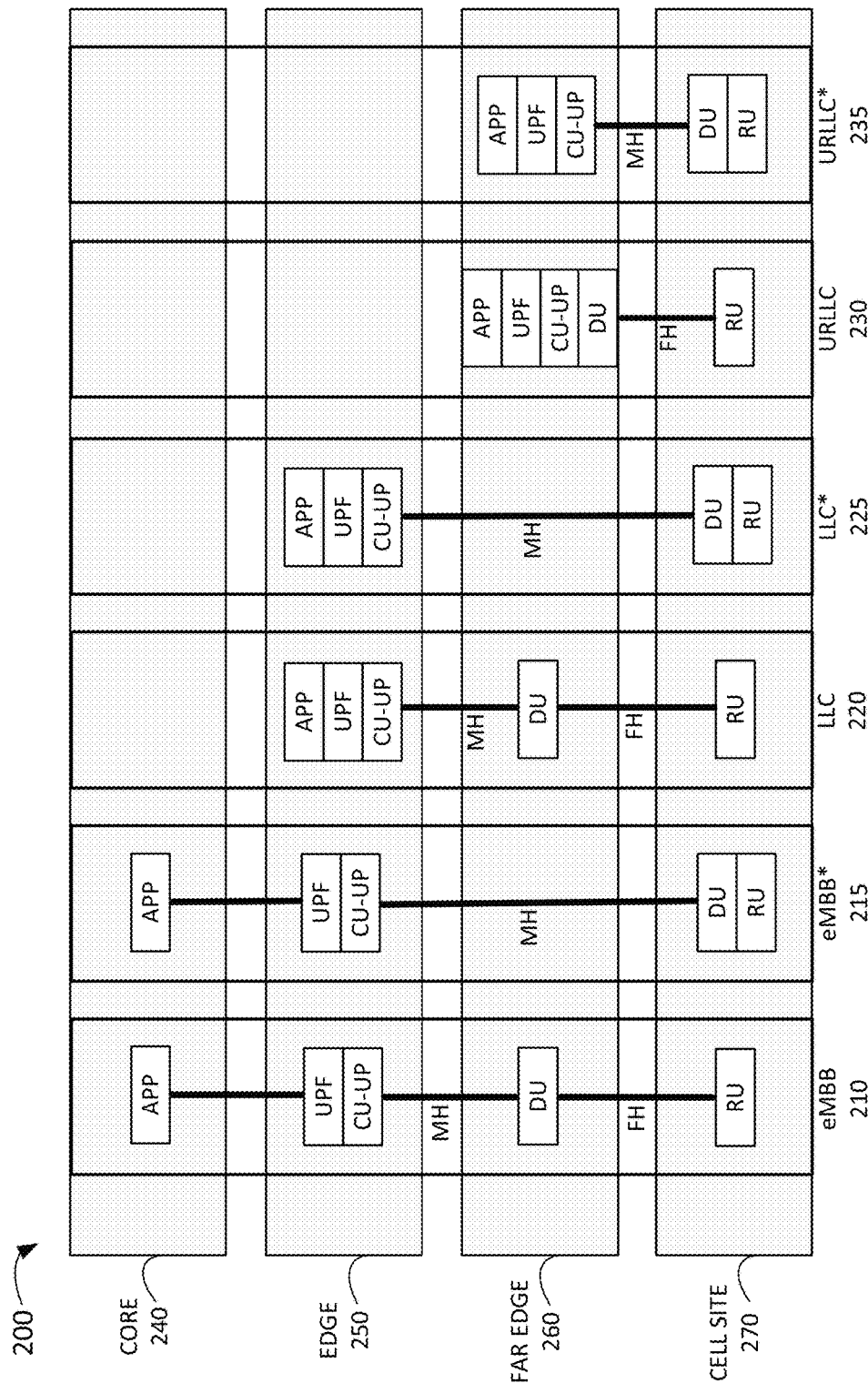
FIG. 2 is a diagram illustrating different network service infrastructures according to an implementation described herein.

FIG. 2 illustrates different network service infrastructures designs that may be used with exemplary embodiments described herein. As shown, the different network service infrastructures may be implemented across multiple types of network locations, from, for example, a core network 240, to an edge network site 250, to a far edge network site 260, and to a cell site 270 in a RAN, such as RAN 120. Each of the different types of network service infrastructures includes xHaul transport domains, such as, for example, backhaul, midhaul, and fronthaul transport domains, which may span the different multiple types of network locations shown in FIG. 2. In some implementations, elements 240-270 may correspond to elements implemented in core network 130, data networks 135, and/or RAN 120.

In a first example of a network service infrastructure design, enhanced mobile broadband (eMBB) 210, an application ("APP") may reside in core network 240 and may connect to a user plane function ("UPF") in edge network 250. The UPF in eMBB 210 may be co-located, in edge network site 250, with a central unit-user plane ("CU-UP") (e.g., at a same datacenter). The UPF and CU-UP in eMBB 210 may connect with one another via a backhaul ("BH") transport domain (not shown). The BH transport domain may include the intermediate link(s) between transport nodes (e.g., UPF) in, or close to, core network 240 and transport nodes (e.g., CU-UP) in one or more edge network sites 250. The CU-UP in edge network site 250 may connect to a RAN distributed unit (DU) via a midhaul ("MH") transport domain located in far edge network site 260. The MH transport domain may include the intermediate link(s) between transport nodes (e.g., CU-UPs) close to core network 240 and the radio controllers (e.g., DUs) in a wireless network. The DU may connect to a RAN radio unit (RU) at a RAN cell site 270 via a fronthaul ("FH") transport domain. The FH transport domain may include the intermediate link(s) between the radio controllers (e.g., DUs) and the radio heads (e.g., RUs) in a wireless network.

In a second example of a network service infrastructure design, eMBB* 215, an APP may reside in core network 240 and may connect to a UPF in edge network 250. The UPF in eMBB* 215 may be co-located, in edge network site 250, with a CU-UP (e.g., at a same datacenter). The UPF and CU-UP in eMBB* 215 may connect with one another via a BH transport domain (not shown). The CU-UP in edge network site 250 may connect to a DU, located at a RAN cell site 270, via an MH transport domain. The DU may connect to an RU at RAN cell site 270 via an FH transport domain. The DU and RU in eMBB* 215 may be co-located, at RAN cell site 270.

In a third example of a network service infrastructure design, low latency communication (LLC) 220, an APP may reside in edge network 250, along with the UPF and CU-UP. In the example shown, the APP, UPF, and CU-UP may be co-located (e.g., at a same datacenter). The UPF and CU-UP in LLC 220 may connect with one another via a BH transport domain (not shown). The CU-UP in edge network site 250 may connect to a DU, located in far edge network site 260, via an MH transport domain. The DU may connect to an RU at a RAN cell site 270 via an FH transport domain.

In a fourth example of a network service infrastructure design, LLC* 225, an APP may reside in edge network site 250, along with the UPF and CU-UP. In the example shown, the APP, UPF, and CU-UP may be co-located (e.g., at a same datacenter). The UPF and CU-UP in LLC* 225 may connect with one another via a BH transport domain (not shown). The CU-UP in edge network site 250 may connect to a DU, located at a RAN cell site 270, via an MH transport domain. DU and RU may be co-located at the RAN cell site 270, and may connect with one another via an FH transport domain.

In a fifth example of a network service infrastructure design, ultra-reliable LLC (URLLC) 230, an APP may reside in far edge network site 260, along with the UPF, CU-UP, and DU. The APP, UPF, CU-UP, and DU may be co-located (e.g., in a same datacenter, or within multiple closely-located datacenters). The UPF may connect to the CU-UP via a BH transport domain (not shown), and the CU-UP may connect to the DU via an MH transport domain. The DU in far edge network site 260 may connect to an RU at a RAN cell site 270 via an FH transport domain.

In a sixth example of a network service infrastructure design, URLLC* 235, an APP may reside in a far edge network site 260, along with the UPF, and the CU-UP. The APP, UPF, and CU-UP may be co-located (e.g., in a same datacenter, or within multiple closely-located datacenters). The UPF may connect to the CU-UP via a BH transport domain (not shown). The CU-UP may connect to a DU, located in RAN cell site 270, via an MH transport domain. The DU, at the RAN cell site 270 may connect to an RU via an FH transport domain. The DU and the RU, in URLLC* 235, may be co-located at RAN cell site 270.

FIG. 2 illustrates multiple different examples of network service infrastructure designs that may be employed herein. Other designs, however, having different configurations than those shown, may be used with the exemplary embodiments described herein. For example, an "aggregation site" may be located between edge network site 250 and far edge network site 260.

The components depicted in FIG. 2 may be implemented as dedicated hardware components or as virtualized functions implemented on top of a common shared physical infrastructure using SDN. For example, an SDN controller may implement one or more of the components of FIG. 2 using an adapter implementing a virtual network function (VNF) virtual machine, a containerized network function (CNF) container, an event driven serverless architecture interface, and/or another type of SDN architecture. The common shared physical infrastructure may be implemented using one or more devices 400 described below with reference to FIG. 4 in a cloud computing center associated with core network 130. Additionally, or alternatively, some, or all, of the common shared physical infrastructure may be implemented using one or more devices 400 described below with reference to FIG. 4 using a MEC system associated with base stations 125.

Figure 3:
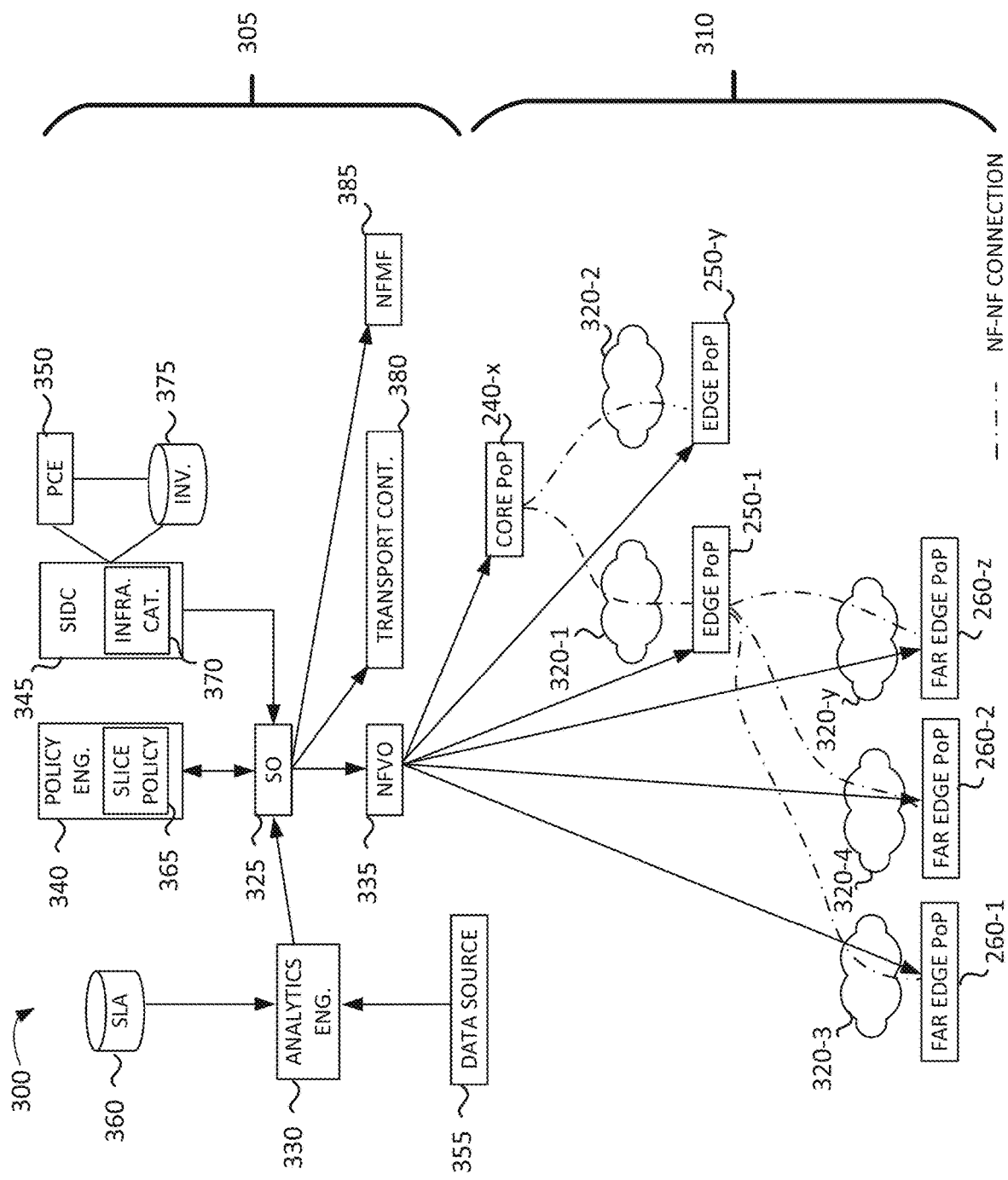
FIG. 3 is a diagram illustrating an exemplary network environment in which according to an implementation described herein.

FIG. 3 illustrates an exemplary network environment 300 in which network service orchestration and transport path management, as described herein, may be implemented. Network environment 300 may include a service orchestration and transport path management section 305 and a data transport section 310. Data transport section 310 may include multiple points of presence (PoPs) or datacenters 240-x (or 240), 250-1, 250-y (collectively, 250), 260-1, 260-2, and 260-z (collectively, 260), interconnected via respective transport networks 320-1 through 320-y. In an exemplary eMBB 210 network function virtual infrastructure (NFVI), an APP may be located at Core PoP 240, a UPF and a CU-UP may be co-located at Edge PoP 250, a DU 240 may be located at Far Edge Pop 260, and an RU may be located at cell site 270 (shown in FIG. 2).

An APP may include any type of application that sends data to, and/or receives data from, a UE wirelessly connected to a RAN cell site during a network session in which a network service is maintained at performance levels according to an applicable SLA. The APP may be instantiated as a virtual network function (VNF) at Core PoP 240, or in another network device connected to core transport network 320-1. The UPF may include a logical node that hosts packet routing and forwarding, policy enforcement, and data buffering functions, and includes functionality for interconnecting with a data network 135 (e.g., the Internet). In one implementation, the UPF may be instantiated as a VNF at Edge PoP 250. The CU-UP may include a logical node that hosts user plane functions, such as, for example, data routing and transport functions. In one implementation, the CU-UP may be instantiated as a VNF at Edge PoP 250. The DU may include a logical node that hosts functions associated with the radio link control (RLC) layer, the medium access control (MAC) layer, and the physical (PHY) layer. In one implementation, the DU may be instantiated as a VNF at Far Edge PoP 260. The RU may include at least one radio transceiver, and associated antenna(s), for RF wireless communication with one or more UEs 110 (FIG. 1). The RU may additionally include a logical node that operates and controls the at least one radio transceiver. In one implementation, the logical node of the RU may be implemented as a VNF instantiated at cell site 270 (FIG. 2). The DU and the RU together may be components of a New Radio (NR) Next Generation gNodeB used in the RAN of a Next Generation mobile network, such as, for example, a 5G mobile network.

As shown, a transport network 320-1 may interconnect the APP and the UPF, and transport network 320-3 may interconnect the CU-UP and the DU. Transport network 320-1 and transport network 320-3 may each include one or more links for interconnecting respective PoPs 240, 250, and 260. In network environment 300 of FIG. 3, data may be transported, for example, from the APP to the RU (for wireless transmission to a destination UE 110) via the UPF, the CU-CP, and the DU and via the interconnected transport networks 320. Furthermore, data (e.g., received from UE 110 via wireless transmission) may be transported from the RU to the APP via the DU, the CU-UP, the UPF and via the interconnected transport networks 320.

Network service orchestration and NFVI management of VNFs within network environment 300 may involve instantiation and execution of various VNFs at PoPs 240, 250, 260, and removal (and possible re-installation) of identified VNFs at PoPs 240, 250, 260. For example, the UPF, CU-UP, DU, and RU may be implemented as VNFs and instantiated at PoPs 240, 250, 260 to form a network infrastructure for providing a particular network service to UE 110. Based on congestions (e.g., anticipated failure to meet SLA) and/or faults (e.g., SLA not satisfied) identified in network infrastructure or, alternatively, in a sub-infrastructure of the network infrastructure, the UPF, CU-UP, DU and/or RU may be removed from a first datacenter and re-instantiated in a different datacenter at a different location in a same network, or in a different network (e.g., from the core network to an edge network, from an edge network to a far edge network, etc.). VNFs may each perform various different functions in network environment 300, and NFVIs may include a number of components, including, for example, hardware resources (e.g., compute, storage, and network resources), a virtualization layer, and virtual resources (e.g., virtual compute, virtual storage, and virtual network resources).

Service orchestration and transport path management section 305 may include a service orchestrator (SO) 325, an analytics engine 330, a network functions virtual orchestrator (NFVO) 335, a policy engine 340, a service infrastructure design controller (SIDC) 345, a path computation engine (PCE) 350, a transport controller 380, and network function management function (NFMF).

Performance and activity data, associated with the transport of data via a transport path between the APP and the RU for an identified application service accessed by UE 110, may be forwarded to analytics engine 330 from sources 355 (e.g., particular nodes). The sources of performance and activity data may include, for example, PoPs 240 250, 260, cell site 270, one or more UEs 110, and/or one or more nodes in transport networks 320. In one embodiment, the performance and activity data include one or more key performance indicators (KPIs). Analytics engine 330 may obtain SLA data for a set of SLA performance requirements associated with the identified application service and/or UE 110, for example, from an SLA database 360. SLA database 360 may store and maintain service requirement profiles for network customers (e.g., UE 110). Each service requirement profile describes a particular network customer's network service performance requirements. SLA database 360 may, for example, be searched based on a network customer identifier (ID) to retrieve a corresponding network customer's service requirement profile which specifies the network customer's required latency, throughput, reliability, availability, and/or redundancy network service parameters.

Analytics engine 330 may compare the performance and activity data to the set of SLA performance requirements. Based on results of the comparison, analytics engine 330 may determine whether the SLA performance requirements, including latency, throughput, reliability, availability, and/or redundancy, are satisfied and/or not likely to be maintained over the duration application service session. In one implementation analytics engine 330 may determine whether congestion and/or a fault condition exists in the current transport path.

SO 325 may obtain transport path/SLA performance data from analytics engine 330. SO 325 may use the data obtained from analytics engine 330 to determine whether the current transport infrastructure should be adapted to create an alternative transport infrastructure for maintaining application service availability. Based on a determination that network function relocation, involving one or more sub-infrastructures of the transport infrastructure, would be an effective option (over, for example, re-routing of the network path) for maintaining SLA requirements for the application service session, SO 325 may obtain policy information from policy engine 340.

In one implementation, the policy information obtained policy engine 340 may include policies that define allowed network infrastructures for the particular application service and/or UE 110. In other implementations, policy engine 340 may include slice policy 365 information that may identify allowed network slices for a corresponding network service. Based on a determination that the policies indicate that alternative network infrastructures are allowed, SO 325 may generate and send a message to SIDC 345 that instructs SIDC 345 to identify one or more network infrastructures that are candidates for relocating the current transport path to maintain the SLA for the application service. In one implementation, the message may include service requirements including SLA requirements and/or service profiles associated with the application service. In some implementations, SIDC 345 may be implemented as part of (e.g., an extension), for example, an open network automation platform (ONAP) service design center (SDC).

SIDC 345 may include an infrastructure catalog 370 that stores network infrastructure profiles that provide transport paths for a corresponding particular service profile. In one implementation, infrastructure catalog 370 obtains the network infrastructure profiles from an inventory database 375 which orders the network infrastructure profiles based on a deployment preference value associated with each of the network infrastructure profiles. Inventory database 375 may store and maintain service network infrastructure design profiles of service network infrastructures in a network. In one implementation, deployment preference values include abstracted "distances" between nodes in a transport path associated with a network infrastructure. For example, PCE 350 may calculate a logical "distance" which may be a function of latency, inversely proportional to bandwidth, inversely proportional to reliability, etc. In one implementation, the calculated distances are based on the build of the network (e.g., size of the circuit), the current usage (e.g., based on monitoring), and expected usage (e.g., based on projected use of yet-to-be deployed services). Based on the calculations, abstracted "distances" may be associated with transport infrastructure inventory, and PCE 350 may determine the "shortest" alternative transport paths for a particular service profile and a corresponding SLA requirements profile. PCE 350 provides the alternative network service infrastructures to SIDC 345 as candidates for maintaining service availability at SLA requirements in response to a detected and/or projected outage and/or congested network conditions.

In one implementation, SIDC 345 may identify infrastructure design parameters associated with physical and virtual components of a particular network infrastructure. The design parameters may specify, for example, 1) a number of instances of virtual network functions (VNFs), 2) locations (e.g., PoPs 240, 250, 260) of the instances of the VNFs, 3) location types (e.g., edge, far edge, core, cell site, etc.) of the locations of the instances of the VNFs, 4) virtual links and/or physical links between the instances of the VNFs, 5) built-in redundancies in the infrastructure design of the multiple transport networks 320, and/or 6) a configuration of the multiple transport networks 320 of the network infrastructure. The configuration of the multiple transport networks may include design parameters that detail the physical and virtual configuration of each transport network 320 and how they interconnect.

SIDC 345 may select one or more alternative network service infrastructures and/or sub-infrastructures based on some or all of the above data. In one implementation, SIDC 345 may determine whether NFVI inventory can support instantiation of the NFs for the selected network infrastructure(s). SO 325 may determine whether one or more service policies allow for the alternative network service infrastructure(s).

NFVO 335 may, based on instructions received from SO 325, deploy the alternative network service infrastructures and/or sub-infrastructures to orchestrate within data transport section 310. A transport controller may, based on the instructions from SO 325, initiate configuration of transport networks 320 to support the alternative network service infrastructures and/or sub-infrastructures. A transport controller 380 may, based on the instructions from SO 325, initiate configuration of transport networks to support the alternative network service infrastructures and/or sub-infrastructures. A network function management function (NFMF) 385 may, based on the instructions from SO 325, initiate configuration of NF instances to support the alternative network service infrastructures and/or sub-infrastructures. NFMF 385 may, based on instructions received from SO 325, delete the previous network service infrastructure.

The configuration of network components of network environment 300 shown in FIG. 3 is for illustrative purposes. Other configurations may be implemented. Therefore, network environment 300 may include additional, fewer and/or different components, that may be configured in a different arrangement, than that depicted in FIG. 3. For example, any of the elements being shown as being in service orchestration and transport path management section 305 may instead be in data transport section 310, or vice versa. Additionally, though transport networks 320 are shown in FIG. 3 as being separate networks, that may have multiple links, in some implementations, transport networks 320 may be implemented as buses within a single datacenter, or as a short distance link (e.g., a short run of optical fiber) between two datacenters.

Figure 4:
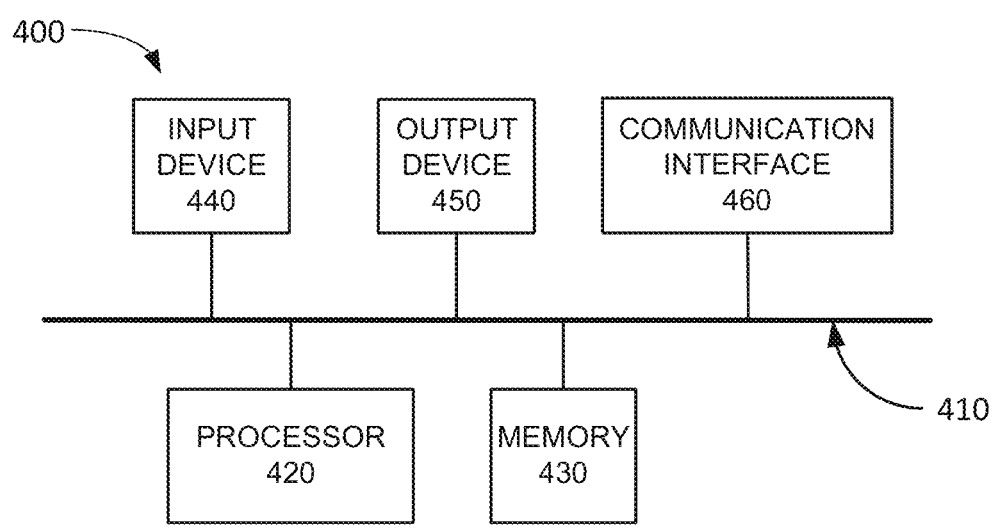
FIG. 4 is a diagram illustrating exemplary components of a device that may be included in a component of FIG. 1, FIG. 2, or FIG. 3 according to implementations described herein.

FIG. 4 illustrates example components of a device 400 according to an implementation described herein. UE device 110, base station 125 and/or other components of RAN 120, core network 130, data network 135, service orchestration and transport path management section 305, and/or data transport section 310 may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the user. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to network service infrastructure orchestration and management. Device 400 may perform operations described herein in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
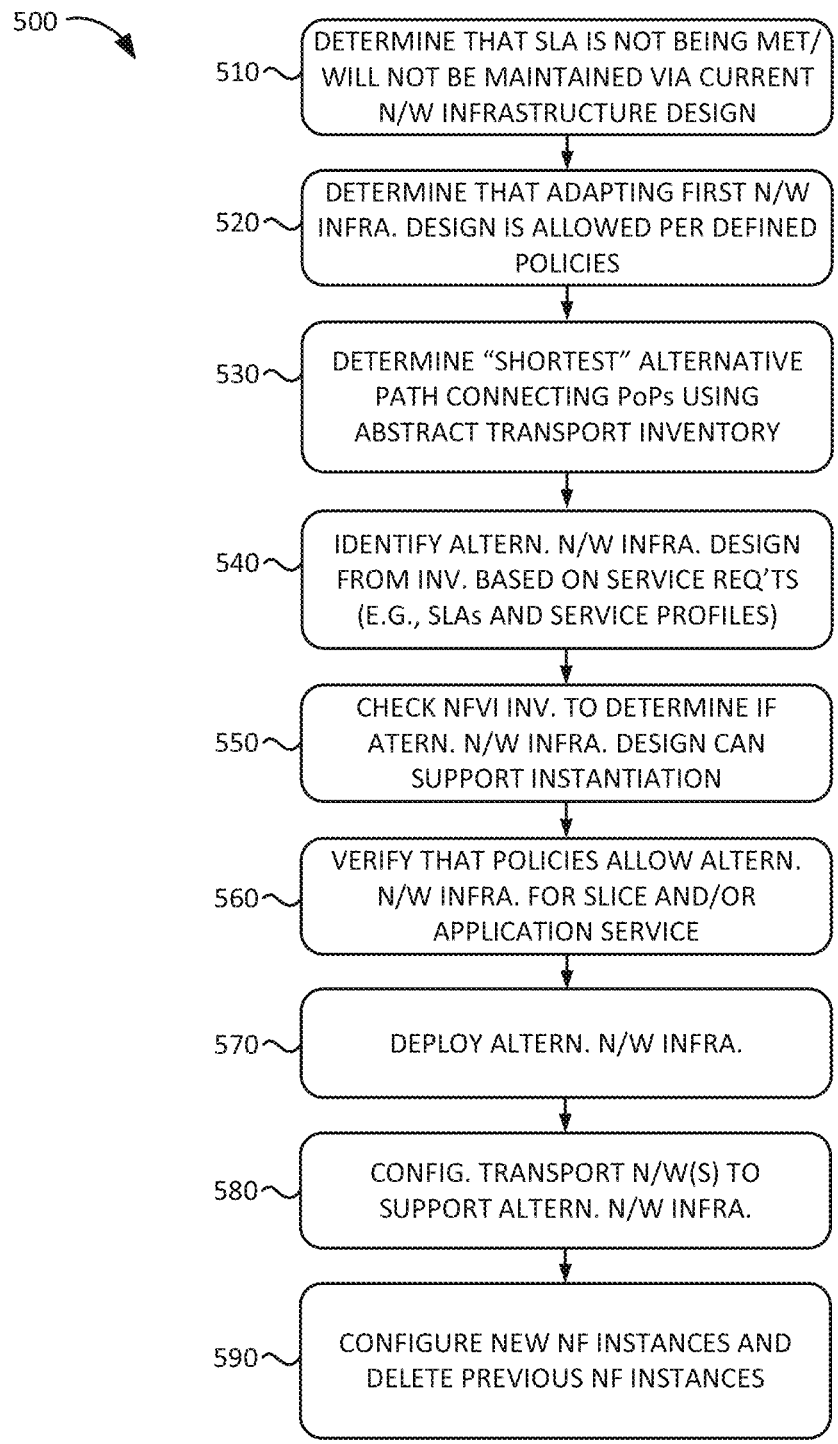
FIG. 5 is a flow diagram of an exemplary process for network service orchestration of virtual network infrastructures according to an implementation described herein.

FIG. 5 is a flow diagram of an exemplary process 500 for network and/or slice service infrastructure orchestration and management using a service requirements profile associated with a network customer. The exemplary process of FIG. 5 may be implemented by SO 325, in conjunction with analytics engine 330, NFVO 340, and/or SIDC 345. According to an exemplary implementation, processor 420 executes software in memory 430 to perform features illustrated in FIG. 5, and described herein. Alternatively, features illustrated in FIG. 5 and described herein, may be performed in an execution of only hardware.

Referring to FIG. 5, exemplary process 500 may include analytics engine 330 using performance and activity data, collected from data sources, to determine whether one or more SLAs are not currently being met or cannot be maintained over a network and/or slice service infrastructure during a network session (block 510). For example, data sources 355 may provide KPIs associated with a data session. Analytics engine 330 may receive the transport network activity and performance data from nodes in data transport section 310 of network environment 300, including from VNFs that implement UPFs, CU-UPs, DUs, RUs, and/or transport networks 320. In one implementation, analytics engine 330 may obtain, from SLA database 360, a service requirements profile associated with a network customer and/or a slice or an application service, based on the network customer's customer ID. The service requirements profile may, for example, describe the network and/or slice service performance requirements with respect to latency, throughput, reliability, availability, and/or redundancy network and/or slice service requirements.

SO 325 may determine that the most effective or the only action that may be taken to restore and/or maintain SLAs for network session availability, is to adapt or re-design the current network infrastructure design used to deliver a network and/or slice service, and may verify that such re-design is allowed per the applicable network and/or slice/service policies obtained from policy engine 340 (block 520). For example, SO 325 may determine that simply re-routing the network session/data flow in the network may not result in SLAs being met, and instead, that changes to the current network infrastructure design for data transport may impact performance characteristics including bandwidth, packet loss, latency (e.g., latency variability), throughput, reliability, jitter, retransmission, connectivity, and/or availability parameters.

For each allowed network infrastructure design and/or associated sub-infrastructures, SIDC 345 may compute a relative network path "distance," for example, between PoPs 320 based on abstracted transport inventory generated by PCE 350 and store in inventory database 375 (block 530). In one implementation, the "distances" may be a function of latency over the network path, for example, inversely proportional to bandwidth over the network path, inversely proportional to reliability over the network path, etc. The "distances" may be abstracted to relative distance values for each network path and/or path segment (e.g., sub-infrastructure).

SO 325 may instruct SIDC 345 to identify alternative network infrastructure designs based on applicable network and/or slice/service requirements that may be based on SLAs, service profiles (which may include a network slice type), or other information (block 540). In response, SIDC 345 may select one or more candidate alternative network infrastructure or sub-infrastructure designs from infrastructure catalog 370. SIDC 345 may check NFVI inventory (e.g., inventory database 375) to ensure that each of the identified candidates can be instantiated (block 550). In one implementation, SIDC 345 may examine service network infrastructure design profiles that specify design characteristics of the various transport networks of a network infrastructure design. SO 325 may automatically keep track of the virtualized design of each network infrastructure currently implemented within the network and/or network slice, including generating parameters associated with physical and virtual components of a particular network infrastructure design. The generated parameters for each network infrastructure may be collected as data components of alternative designs. In one implementation, each design may include parameters specifying, 1) a number of instances of VNFs, 2) locations (e.g., PoPs) of the instances of the VNFs, 3) location types (e.g., edge, far edge, core, cell site, etc.) of the locations of the instances of the VNFs, 4) virtual links and/or physical links between the instances of the VNFs, 5) built in redundancies in the infrastructure design of the multiple transport domains, and/or 6) a configuration of the multiple transport domains of the network slice. The configuration of the multiple transport networks associated with the network infrastructure may include parameters that detail the physical and virtual configuration of each transport network (e.g., fronthaul, mid-haul, and backhaul) and how they interconnect. At each instance of network infrastructure creation and/or modification, SO 325 may generate the design parameters of the transport networks of the network infrastructure, generate a design that incorporates the design parameters, and store the generated design in infrastructure catalog 370. SO 325 may subsequently retrieve the design for a particular network infrastructure from infrastructure catalog 370 and/or inventory database 375.

SO 325 may verify that network and/or slice/service policies allow for the alternative network infrastructure design selected (block 560). Based on successful verification, SO 325 may instruct NFVO 335 to install or instantiate one or more VNFs at one or more nodes in the alternative network infrastructure to perform data transport in accordance with SLAs metrics (e.g., bandwidth, packet loss, latency, throughput, reliability, jitter, retransmissions, connectivity) for a network session (block 570). SO 325 may instruct transport controller 380 to configure transport networks 320 to support the alternative network infrastructure (block 580). SO 325 may instruct NFMF 385 to configure new network function (NF) instances to create the alternative network infrastructure and, in some implementations, delete the current network infrastructure for the particular network session (block 590).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 5, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving network performance indicator data associated with a network slice connected to a user equipment (UE) device via a first type of network infrastructure including a first distributed unit (DU) of a radio access network (RAN) located in a far edge network site, wherein the first DU connects via a fronthaul transport domain to a radio unit (RU) located at a cell site, wherein the first type of network infrastructure further includes multiple alternative data transport paths from an application instance to the first DU and each of the alternative data transport paths including data transport nodes linked across multiple types of network locations;

determining, based on the network performance indicator data, that one or more service level agreements (SLAs) for the network slice will not be maintained for a duration of a network session, and that a rerouting of the network session to any of the alternative data transport paths will not result in the one or more SLAs being met for the network session;

identifying, responsive to the determination that the rerouting of the network session will not result in the one or more SLAs being maintained for the duration of the network session, a second type of network infrastructure in which a second DU is co-located with the RU at the cell site, based on service requirements for the network slice, wherein the service requirements include the one or more SLAs and a service profile for the network slice;

accessing a network function virtualization infrastructure (NFVI) database to determine a supportability for an instantiation of the second type of network infrastructure; and instructing an orchestrator to deploy the second type of network infrastructure.

2. The method of claim 1, wherein the first type of network infrastructure comprises an enhanced mobile broadband (eMBB) infrastructure and the second type of network infrastructure comprises a low latency communication (LLC) infrastructure, or wherein the first type of network infrastructure comprises an LLC infrastructure and the second type of network infrastructure comprises an ultra-reliable LLC (URLLC) infrastructure.

3. The method of claim 1, further comprising:
identifying a set of available network infrastructures that include the second type of network infrastructure; and
ordering the set of available network infrastructures based on a deployment preference.

4. The method of claim 3, wherein the deployment preference comprises a logical path distance, and the logical path distance is proportional to latency and inversely proportional to at least one of bandwidth or reliability.

5. The method of claim 1, further comprising:
instructing a network function management function (NFMF) to configure instantiated network function instances for the second type of network infrastructure.

6. The method of claim 1, further comprising:
instructing the orchestrator to delete the first type of network infrastructure.

7. The method of claim 1, further comprising:
deploying the second type of network infrastructure.

8. A device comprising:
a communication interface;
a memory storing instructions; and
a processor configured to execute the instructions to:
receive network performance indicator data associated with a network slice accessed by a user equipment (UE) device via a first type of network infrastructure including a first distributed unit (DU) of a radio access network (RAN) located in a far edge network site, wherein the first DU connects via a fronthaul transport domain to a radio unit (RU) located at a cell site, wherein the first type of network infrastructure further includes multiple alternative data transport paths from an application instance to the first DU and each of the alternative data transport paths including data transport nodes linked across multiple types of network locations;
determine, based on the network performance indicator data, that one or more service level agreements (SLAs) for the network slice will not maintained for a duration of a network session, and that a rerouting of the network session to any of the alternative data transport paths will not result in the one or more SLAs being met for the network session;

identify, responsive to the determination that the rerouting of the network session will not result in the one or more SLAs being met for the duration of the network session, a second type of network infrastructure in which a second DU is co-located with the RU at the cell site, based on service requirements for the network slice, wherein the service requirements include the one or more SLAs and a service profile for the network slice;

access a network function virtualization infrastructure (NFVI) database to determine a supportability for an instantiation of the second type of network infrastructure; and instruct an orchestrator to deploy the second type of network infrastructure over the access network.

9. The device of claim 8, wherein the first type of network infrastructure comprises an enhanced mobile broadband (eMBB) infrastructure and the second type of network infrastructure comprises a low latency communication (LLC) infrastructure, or wherein the first type of network infrastructure comprises an LLC infrastructure and the second type of network infrastructure comprises an ultra-reliable LLC (URLLC) infrastructure.

10. The device of claim 8, wherein the device includes a path computation engine, and wherein the processor is further configured to:
identify a set of available network infrastructures that include the second type of network infrastructure; and
order the set of available network infrastructures based on a deployment preference.

11. The device of claim 10, wherein the deployment preference comprises a logical path distance, and the logical path distance is proportional to latency and inversely proportional to at least one of bandwidth or reliability.

12. The device of claim 10, wherein the processor is further configured to:
instruct a network function management function (NFMF) to configure instantiated network function instances for the second type of network infrastructure.

13. The device of claim 10, wherein the processor is configured to:
instruct the orchestrator to delete the first type of network infrastructure.

14. The device of claim 10, wherein the orchestrator comprises a network function virtualization orchestrator.

15. A non-transitory computer-readable medium for storing instructions which, when executed by a processor associated with a network device, cause the processor to:
receive network performance indicator data associated with a network slice accessed by a user equipment (UE) device via a first type of network infrastructure including a first distributed unit (DU) of a radio access network (RAN) located in a far edge network site, wherein the first DU connects via a fronthaul transport domain to a radio unit (RU) located at a cell site, wherein the first type of network infrastructure further includes multiple alternative data transport paths from an application instance to the first DU and each of the alternative data transport paths including data transport nodes linked across multiple types of network locations;
determine, based on the network performance indicator data, that one or more service level agreements (SLAs) for the network slice will not be maintained for a duration of a network session, and that a rerouting of the network session to any of the alternative data transport paths will not result in the one or more SLAs being met for the network session;

identify, responsive to a determination that the rerouting will not result in the one or more SLAs being met for the duration of the network session, a second type of network infrastructure in which a second DU is co-located with the RU at the cell site, based on service requirements for the network slice, wherein the service requirements include the one or more SLAs and a service profile for the network slice;

access a network function virtualization infrastructure (NFVI) database to determine a supportability for an instantiation of the second type of network infrastructure; and instruct an orchestrator to deploy the second type of network infrastructure.

16. The non-transitory computer-readable medium of claim 15, wherein the first type of network infrastructure comprises an enhanced mobile broadband (eMBB) infrastructure and the second type of network infrastructure comprises a low latency communication (LLC) infrastructure, or
wherein the first type of network infrastructure comprises an LLC infrastructure and the second type of network infrastructure comprises an ultra-reliable LLC (URLLC) infrastructure.

17. The non-transitory computer-readable medium of claim 15, wherein the network device includes a path computation engine, the processor being further configured to:

identify a set of available network infrastructures that include the second type of network infrastructure; and order the set of available network infrastructures based on a deployment preference.

18. The non-transitory computer-readable medium of claim 17, wherein the deployment preference comprises a logical path distance, and the logical path distance is proportional to latency and inversely proportional to at least one of bandwidth or reliability.

19. The non-transitory computer-readable medium of claim 15, the processor being further configured to:

instruct a network function management function (NFMF) to configure instantiated network function instances for the second type of network infrastructure.

20. The non-transitory computer-readable medium of claim 15, the processor being further configured to:

instruct the orchestrator to delete the first type of network infrastructure.

* * * * *